United States Patent

Inada et al.

[11] Patent Number: 5,962,927
[45] Date of Patent: Oct. 5, 1999

[54] METHOD OF CONTROLLING GENERATOR DRIVING ENGINE AND SYSTEM FOR EMBODYING THE SAME

[75] Inventors: Eiji Inada, Kanagawa-ken; Shinichirou Kitada, Tokyo; Toshio Kikuchi, Kanagawa-ken; Hiroyuki Hirano, Kanagawa-ken; Ryuichi Idoguchi, Kanagawa-ken; Takeshi Aso, Kanagawa-ken; Yuutarou Kaneko, Kanagawa-ken, all of Japan

[73] Assignee: Nissan Motor., LTD., Kanagawa, Japan

[21] Appl. No.: 08/955,571

[22] Filed: Oct. 22, 1997

[30] Foreign Application Priority Data

Oct. 22, 1996 [JP] Japan .................................. 8-279623

[51] Int. Cl.$^6$ .................................................. F02M 37/00
[52] U.S. Cl. ........................................................ 290/40 R
[58] Field of Search ...................... 290/40 R, 41, 290/40 A, 40 B, 40 C; 123/518, 519, 520; 322/16

[56] References Cited

U.S. PATENT DOCUMENTS

| 4,622,472 | 11/1986 | Bronicki | 290/52 |
|---|---|---|---|
| 5,371,412 | 12/1994 | Iwashita et al. | 290/1 R |
| 5,621,304 | 4/1997 | Kiuchi et al. | 322/18 |
| 5,735,251 | 4/1998 | Hyodo et al. | 123/518 |
| 5,808,367 | 9/1998 | Akagi et al. | 290/40 C |
| 5,875,765 | 3/1999 | Norton | 123/520 |

FOREIGN PATENT DOCUMENTS

| 5-270294 | 10/1993 | Japan . |
|---|---|---|
| 6-233410 | 8/1994 | Japan . |

*Primary Examiner*—Nestor Ramirez
*Assistant Examiner*—Nicholas Ponomarenko
*Attorney, Agent, or Firm*—McDermott, Will & Emery

[57] ABSTRACT

By calculating a fuel vapor quantity in a fuel tank based on a fuel temperature and a fuel residual quantity in the fuel tank, then calculating a fuel vapor purge quantity based on an engine revolution number and engine torque when an engine is driven, and then estimating a fuel vapor quantity captured in a vapor capturing unit based on the fuel vapor quantity and the fuel vapor purge quantity, the engine can be driven to purge the fuel vapor to the engine before the fuel vapor overflows the vapor capturing unit to thus be discharged into the air.

6 Claims, 8 Drawing Sheets

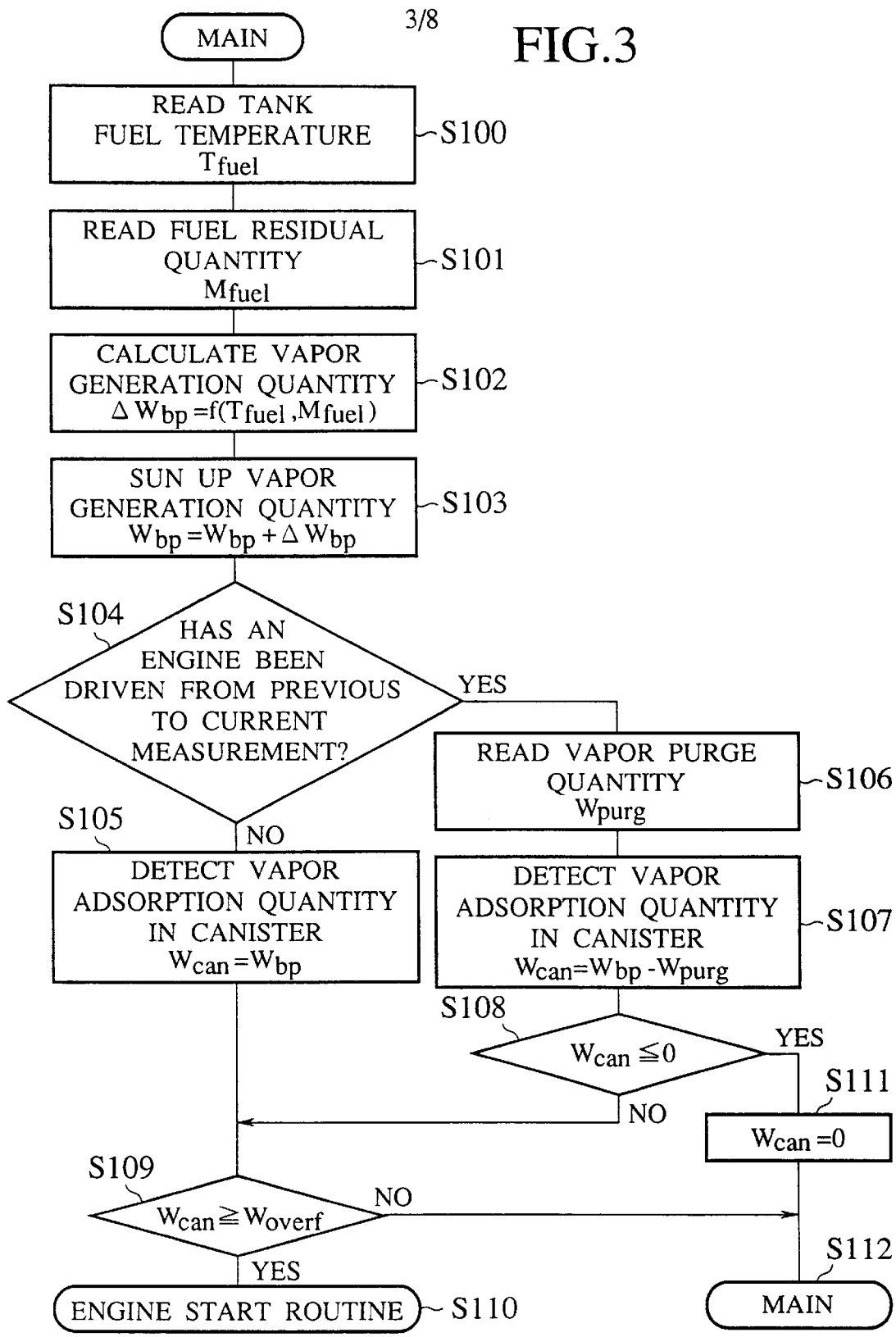

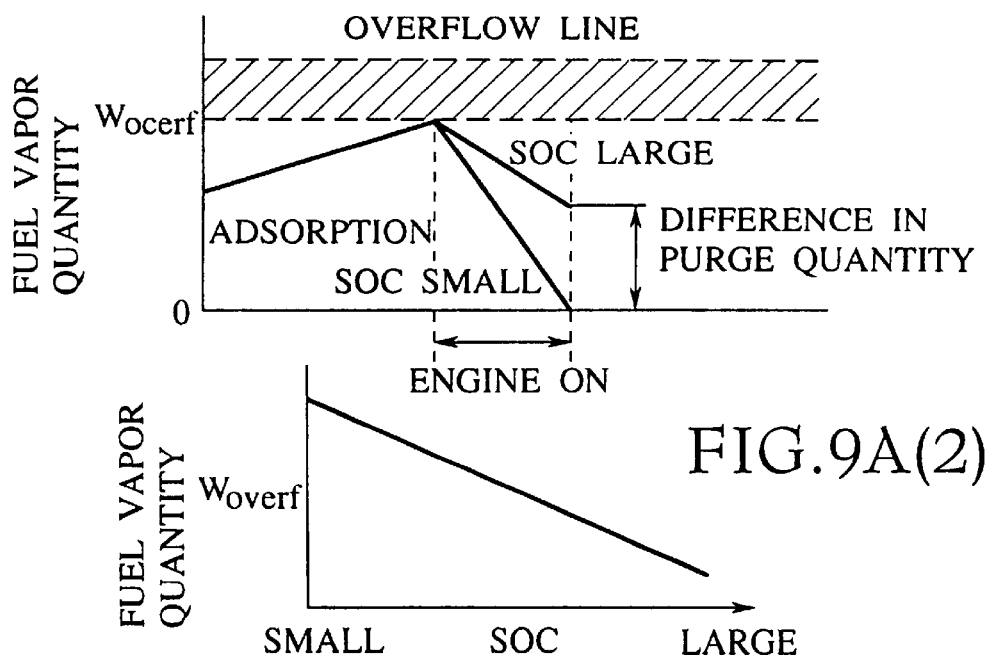
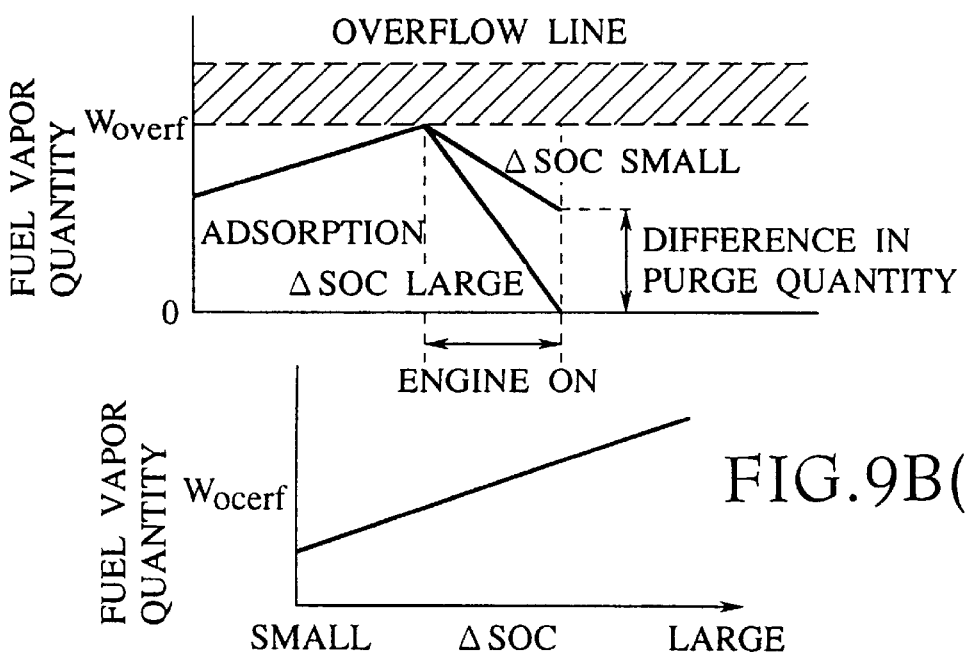

METHOD OF CONTROLLING GENERATOR DRIVING ENGINE AND SYSTEM FOR EMBODYING THE SAME

BACKGROUND OF THE INVENTION

1. Field of the Invention

The present invention relates to a method of controlling a generator driving engine and a system for embodying the same and, more particularly, a method of controlling a generator driving engine installed in a series hybrid electric vehicle and a system for embodying the same.

2. Description of the Related Art

An electric vehicle of the type in which a generator driving engine is installed is called a series hybrid electric vehicle (abbreviated to "SHEV" hereinafter). The SHEV aims at improving a cruising distance of the electric vehicle, etc. Where the "generator driving engine" signifies an apparatus which consists of an engine for receiving fuel supply from a fuel tank, and a generator (engine-driven generator) for generating electric energy from mechanical output of the engine.

In the above art, as a control system for the generator driving engine in the SHEV, such a control system has been proposed that, when a battery is in a charged state, the vehicle is made run by battery energy only and, when charged energy of the battery is running low, the generator is operated by driving the generator driving engine to charge the battery and then, when the charged energy of the battery comes up to a predetermined level, an operation of the generator is suspended.

The SHEV has in essence the property as a low environmental pollution vehicle since, as described above, a frequency of drive of the engine can be decreased in the SHEV as compared to the gasoline-fueled automobile.

In the meanwhile, according to the above control system for the generator driving engine, the vehicle would run only by a driving force of the battery if such a driving method is continued that recharging of the battery from an external device is repeated again and again. For this reason, an exhaust gas is not discharged since the generator driving engine is not driven.

However, an event would be considered that, since an evaporated fuel (vapor) from the fuel tank is not discharged (purged) from an evaporated fuel capturing means (e.g., canister) to the engine, such evaporated fuel is saturated in the evaporated fuel capturing means to thus be discharged into the air. As a result, that event would be contrary to the property as the low environmental pollution vehicle, which is required for the SHEV.

As countermeasures against such disadvantages, two following proposals 1), 2) have been advanced in the conventional art.

1) Patent Application Unexamined Publication (KOKAI) 5-270294:

In this Publication, the hybrid electric vehicle comprises a means for monitoring a crank angle of the engine for driving the generator by a sensor and then forcibly driving the engine (purging the vapor) if the engine is not driven for a predetermined time.

2) Patent Application Unexamined Publication (KOKAI) 6-233410:

In this Publication, the hybrid electric vehicle comprises a means for measuring a weight of the canister by a load cell and then starting the engine if the weight of the canister is in excess of a predetermined weight.

However, the above proposals in the conventional art have drawbacks respectively as follows:

1) A drawback of Patent Application Unexamined Publication (KOKAI) 5-270294:

Since only an unused time of the engine is detected, it is difficult to estimate a vapor quantity and a vapor purge quantity. Therefore, there is possibility that the engine is uselessly driven to thus cause degradation of exhausting performance in total.

2) A drawback of Patent Application Unexamined Publication (KOKAI) 6-233410:

Ordinarily the canister must be fixed to be protected from vibrations of the vehicle. Accordingly, placement and setting of the canister is difficult since the weight must be measured while the canister is in a fixed state. In addition, there is possibility that the engine is operated excessively since the weight of the canister is increased due to moisture adsorption of the canister, and so forth.

SUMMARY OF THE INVENTION

Therefore, the present invention has been made to overcome the above drawbacks, and it is an object of the present invention to provide a method of controlling a generator driving engine capable of eliminating useless drive of the generator driving engine to thereby promote low environmental pollution and a system for embodying the same.

In order to overcome the above drawbacks, according to an aspect of the present invention, there is provided a method of controlling a generator driving engine which includes an engine for receiving fuel supply from a fuel tank, a generator for generating electric energy when driven by mechanical output of said engine, and a battery for accumulating said electric energy generated by said generator, wherein a vehicle can be driven by rotating a motor by virtue of said electric energy accumulated in said battery, said method comprising the steps of detecting a fuel vapor quantity in said fuel tank based on a fuel temperature and a fuel residual quantity in said fuel tank; detecting a fuel vapor purge quantity based on an engine revolution number and engine torque when said engine is driven; and estimating said fuel vapor quantity which is captured by a vapor capturing means, based on said fuel vapor quantity and said fuel vapor purge quantity; wherein said engine can be driven to purge said fuel vapor to said engine before said fuel vapor overflows said vapor capturing means to thus be discharged into an air.

In the preferred embodiment of the present invention, an engine driving timing to purge said fuel vapor is controlled based on a battery charge quantity and a battery consumption quantity per unit time.

According to another aspect of the present invention, there is provided a system for controlling a generator driving engine which includes an engine for receiving fuel supply from a fuel tank, a generator for generating electric energy when driven by mechanical output of said engine, and a battery for accumulating said electric energy generated by said generator, wherein a vehicle can be driven by rotating a motor by virtue of said electric energy accumulated in said battery, said system comprising a fuel vapor quantity calculating means for calculating a fuel vapor quantity in said fuel tank; a purge quantity calculating means for calculating a fuel vapor purge quantity based on an engine revolution number and engine torque when said engine is driven; a vapor capturing means for capturing said fuel vapor; an estimating means for estimating said fuel vapor quantity captured by said vapor capturing means, based on said fuel vapor quantity calculating means and said purge quantity calculating means; and an engine controlling means for driving said engine before said fuel vapor overflows said vapor capturing means to thus be discharged into an air.

In the preferred embodiment of the present invention, a system for controlling a generator driving engine further comprises a timing controlling means for controlling an engine drive timing to purge said fuel vapor based on a battery charge quantity and a battery consumption quantity per unit time.

According to the present invention described above, by calculating the fuel vapor quantity based on the fuel temperature and the fuel residual quantity in the fuel tank and then estimating the vapor quantity in the vapor capturing means (canister), the engine can be driven to purge the vapor into the engine before the vapor overflows the canister to thus be discharged into the air. Hence, useless drive of the generator driving engine can be eliminated, so that low environmental pollution can be promoted and degradation in the air quality can be suppressed.

BRIEF DESCRIPTION OF THE DRAWINGS

FIG. 3 is a flowchart illustrating an operation of a generator driving engine controlling system according to a first embodiment of the present invention;

FIGS. 9A and 9B are conceptual views respectively showing operational principles in the second embodiment of the present invention.

DESCRIPTION OF THE PREFERRED EMBODIMENTS

Embodiments of the present invention will be explained with reference to the accompanying drawings hereinafter.

(1) First Embodiment

Figure 1:
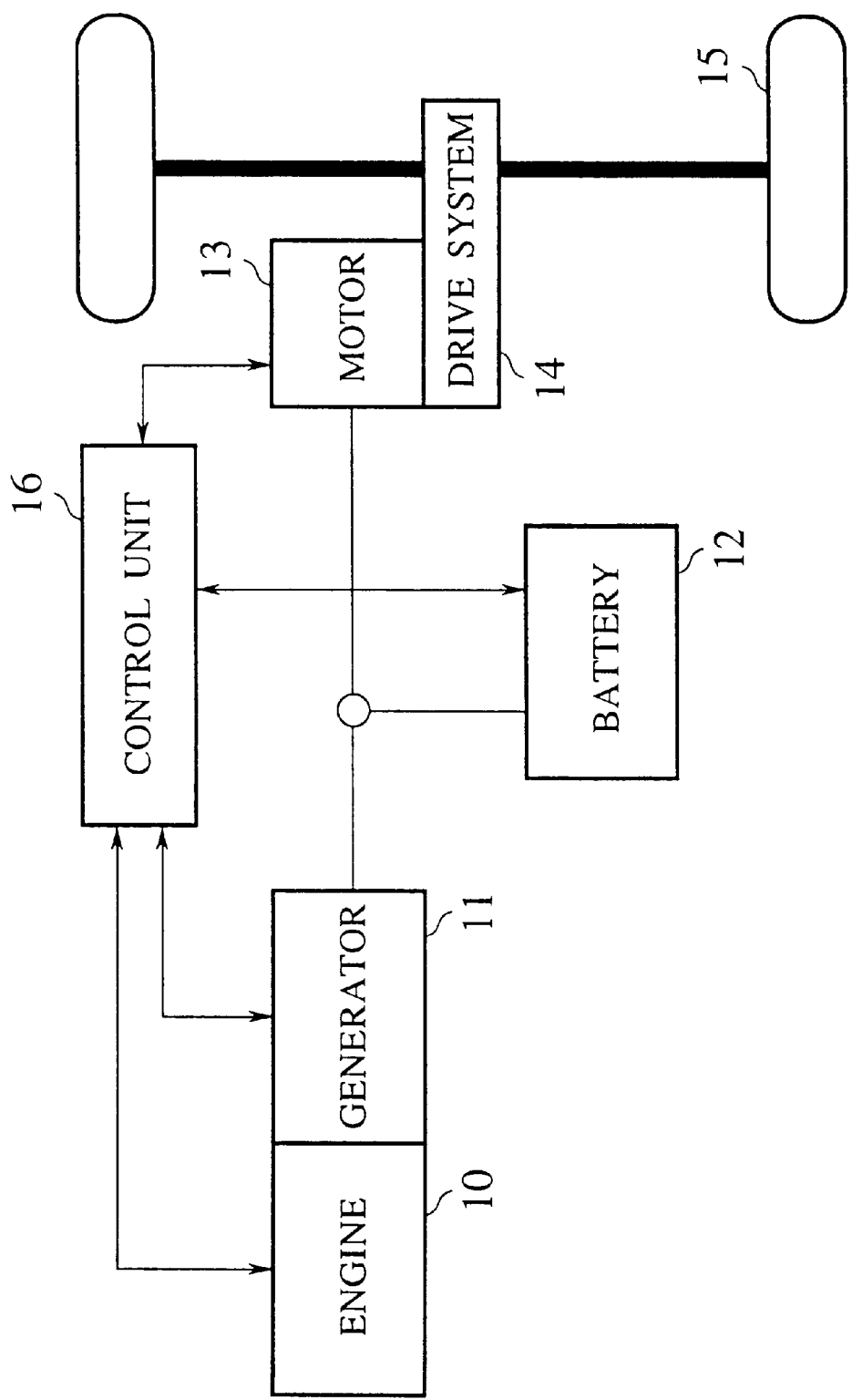
FIG. 1 is a schematic block diagram showing a pertinent system configuration of a SHEV in which a generator driving engine being employed in embodiments of the present invention is installed.

FIG. 1 is a schematic block diagram showing a pertinent system configuration of the SHEV in which a generator driving engine being employed in embodiments of the present invention is installed.

In FIG. 1, reference numeral 10 denotes a generator driving engine; 11, a generator which is driven by the generator driving engine 10 to generate electric energy; 12, a battery for accumulating electric energy supplied from the generator 11, etc.; 13, a motor driving a vehicle by use of electric energy supplied from the battery 12 and for executing energy regeneration at the time of deceleration; 14, a drive system such as speed change gear, reduction gear, etc. for transmitting motor output to a drive wheel 15; and 16, a control unit for controlling operations of these constituent devices.

The motor 13 receives supply of electric power from one of the battery 12 and the generator 11 or both of them. Usually, if energy to satisfy requirements output of the motor 13 is accumulated in the battery 12 (i.e., the battery 12 is in a sufficient charged state), the motor 13 is driven by energy of the battery 12 but both the generator driving engine 10 and the generator 12 are not driven.

However, if energy of the battery 12 does not satisfy the requirements output of the motor 13, otherwise if energy of the battery 12 is below a predetermined set charged energy, the generator driving engine 10 is driven. As a consequence, the generator 11 being coupled mechanically to the engine 10 directly or via a transmission, a belt, etc. can generate electric energy which is then supplied to the motor or employed to charge the battery 12.

If a charged energy quantity of the battery 12 charged in this fashion can satisfy the requirements output of the motor 13, otherwise if the battery 12 comes up to predetermined charged energy, an operation of the generator driving engine 10 is suspended and thus generation of electric energy by the generator 11 is halted.

The control unit 16 executes various control operations as follows. More particularly, input/output control (ON/OFF control) of the driving motor 13, charging/discharging control of the battery 12, output control of the generator 11, start/stop of the generator driving engine 10, and control of the revolution number of the engine 10 by virtue of a throttle valve may be executed. In addition, control of a fuel vapor suppressing (purging) system shown in FIG. 2 (described hereinbelow) may also be executed.

Figure 2:
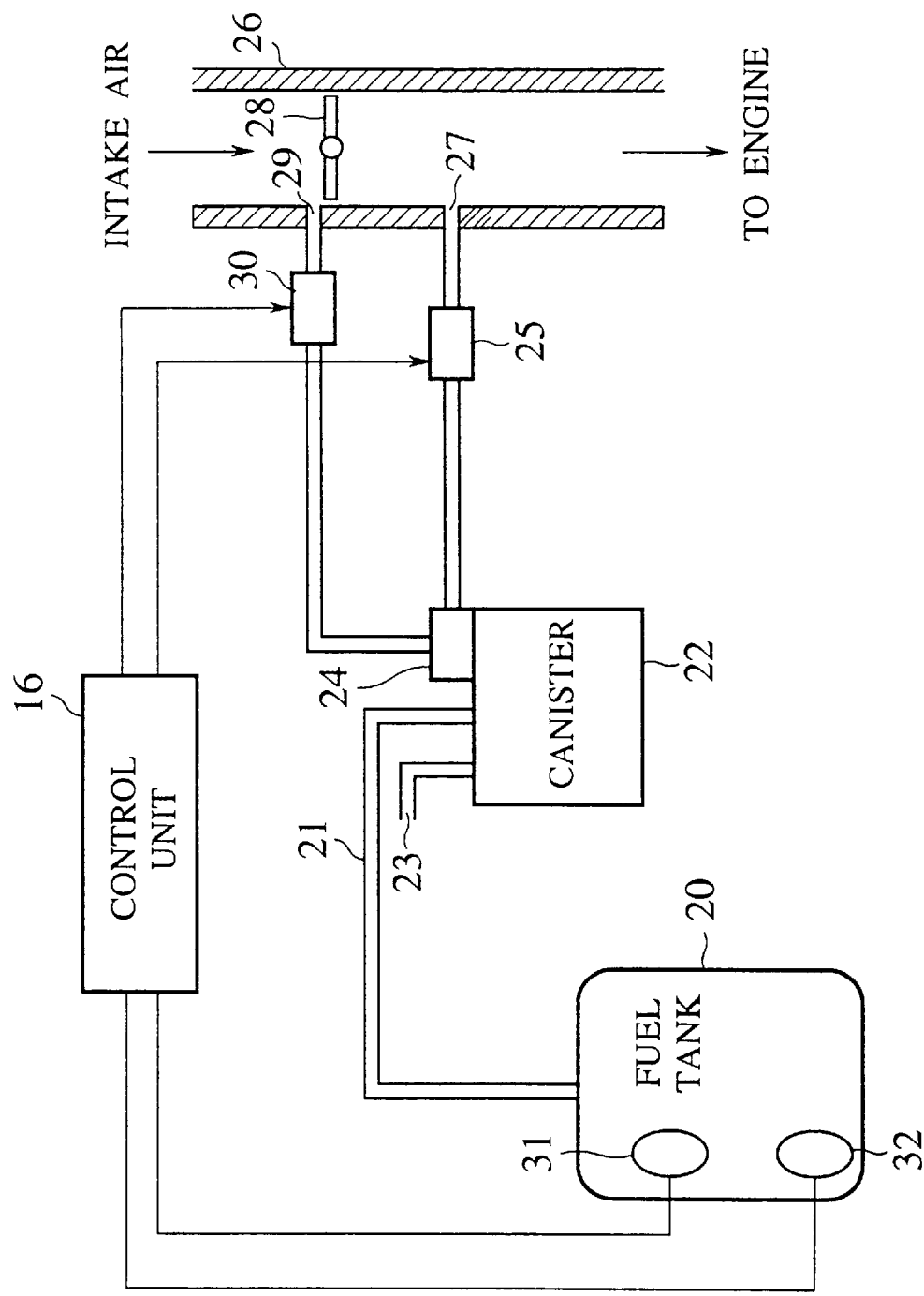
FIG. 2 is a schematic view showing a configuration of a fuel vapor purging system in the SHEV shown in FIG. 1.

FIG. 2 is a schematic view showing a configuration of a fuel vapor suppressing (purging) system in the SHEV shown in FIG. 1 according to a first embodiment of the present invention.

The fuel vapor generated in the fuel tank 20 can be captured by a vapor capturing means such as the canister 22 via a fuel vapor conduit 21. The fuel vapor captured by the canister 22 together with the air introduced from an air introducing pipe 23 can be purged from a purge port 27, which is provided in an intake air pipe 26, via a purge cut valve 24 and a purge control valve 25. Such fuel vapor together with the intake air is then supplied to the engine.

The purge cut valve 24 is opened when a differential pressure caused before and after respective detections comes up to a predetermined value. This differential pressure indicates a difference in pressure between the atmospheric pressure and a pressure introduced from a negative pressure introducing port 29 provided in the vicinity of a throttle valve 28 via a purge VC (Vacuum Control) cut valve 30.

The control unit 16 may control the purge control valve 25 and the purge VC cut valve 30 and also control the vapor purge quantity from the canister 22 and the purge ON/OFF. A fuel temperature measuring sensor 31 and a fuel meter (fuel residual quantity indicator) 32 are provided at the inside of the fuel tank 20 so as to always monitor the tank fuel temperature and the tank fuel residual quantity, thereby supplying resultant signals to the control unit 16.

FIG. 3 is a flowchart illustrating an operation of a generator driving engine controlling system according to a first embodiment of the present invention.

At a starting point of the flowchart in FIG. 3, both the generator driving engine 10 and the generator 11 are in their halted conditions.

Figure 4A:
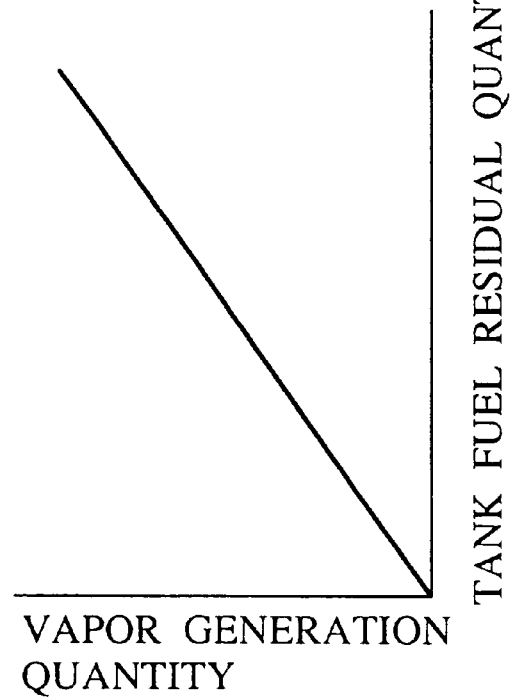
FIGS. 4A and 4B are data charts showing respectively that a vapor generation quantity can be expressed as functions of a fuel temperature in a fuel tank and a fuel residual quantity in the fuel tank, which is utilized in explanations of the flowchart in FIG. 3.
Figure 4B:
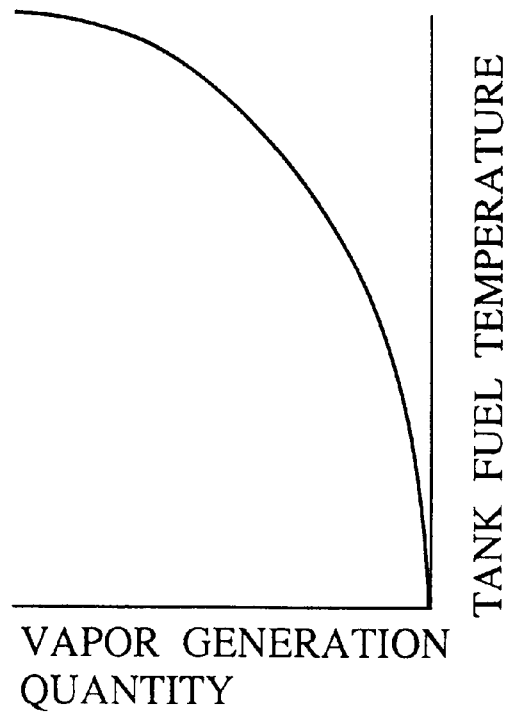

First of all, a value Tfuel of the temperature sensor 31 (i.e., fuel temperature) in the fuel tank 20 is read in step 100 (S100). Similarly, a value Mfuel of the fuel meter (fuel residual quantity indicator) 32 (i.e., fuel residual quantity) is read in S101. As shown in FIGS. 4A and 4B, the fuel vapor quantity in the fuel tank 20 can be expressed as functions of the fuel temperature in the fuel tank and the fuel residual quantity in the fuel tank.

Accordingly, as shown in S102, the fuel vapor quantity $\nabla$Wvapa generated in the fuel tank 20 from previous measurement to current measurement can be estimated by a function f(Tfuel, Mfuel). If a total vapor quantity obtained until previous measurement is assumed as Wvapa, a current total vapor quantity can then be derived as Wvapa=Wvapa+$\nabla$Wvapa, as shown in S103. Where the total vapor quantity Wvapa is equal to Wbp in FIG. 3. In other words, a suffix "bp" means "vapa".

Then, in S104, it is determined whether or not the generator driving engine 10 has been driven during a time period from previous measurement to current measurement. The fact that the generator driving engine 10 has been driven or not may be stored in a memory (not shown) installed in the control unit 16. Unless the generator driving engine 10 has been driven, the process then goes to S105 wherein the vapor adsorption quantity Wcan in the canister 22 is set as Wcan=Wvapa and then the process proceeds to S109.

If it has been determined in above S104 that the generator driving engine 10 has been driven, a vapor purge quantity Wpurge (which has been stored in a memory previously) at the time of engine drive is then read in S106. (Where calculation of the vapor purge quantity at the time of engine drive will be explained later with reference to FIG. 5.) Accordingly, as shown in S107, the current vapor adsorption quantity Wcan in the canister 22 can be calculated as a difference between the vapor quantity in the fuel tank 20 and the purge quantity discharged from the canister 22, i.e., Wcan=Wvapa-Wpurge.

In S108, it is then determined whether or not the vapor adsorption quantity Wcan being calculated in above S107 can satisfy "Wcan$\leq$0". If Wcan$\geq$0, the process then advances to S109. Conversely if Wcan$\leq$0, the vapor adsorption quantity Wcan in the canister 22 is then regarded as 0, so that the vapor adsorption quantity Wcan is reset to Wcan=0 in S111 to avoid accumulated error in calculation. Then, the process returns to a main routine S112.

In S109, the vapor adsorption quantity Wcan in the canister 22 is then compared with an allowable vapor quantity Woverf. Such allowable vapor quantity Woverf has been set beforehand in compliance with a canister capacity.

If the vapor adsorption quantity Wcan exceeds the allowable vapor quantity Woverf (Wcan>Woverf) in S109, it is then determined in S110 that the generator driving engine 10 is in a starting mode. Therefore, the generator driving engine 10 is driven to purge the fuel vapor in the canister 22 into the intake air pipe 26 via the purge control valve 25. As a result, such fuel vapor is burned in the generator driving engine 10.

On the contrary, if Wcan$\leq$Woverf is detected in above S109, it is then determined that there is no necessity of driving the engine 10 to purge the fuel vapor in the canister 22. The process thus returns to the main routine S112.

A value of the allowable vapor quantity Woverf may be set to a value smaller than a critical value so as to afford a margin. If the fuel vapor exceeds such critical value, it then overflows actually the canister 22 to be discharged into the air.

Figure 5:
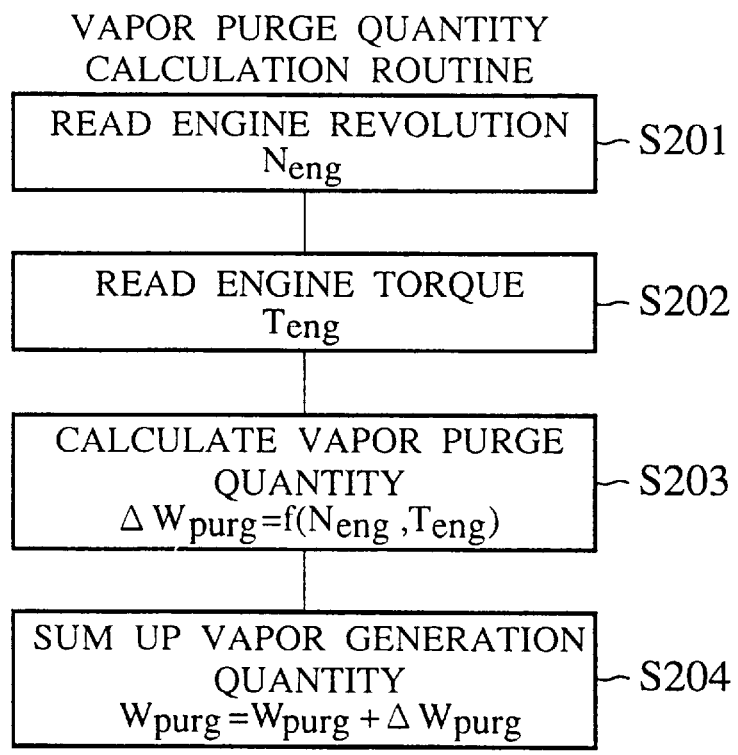
FIG. 5 is a detailed flowchart illustrating a particular step in the flowchart in FIG. 3.

FIG. 5 is a flowchart illustrating control logic to calculate the vapor purge quantity at the time of engine drive in above S106 in FIG. 3.

If the generator driving engine 10 is driven, calculation of the vapor purge quantity at the time of engine drive is then started. An engine revolution number Neng is read in S201 and subsequently engine torque Teng is read in S202. The engine torque Teng can be calculated based on generator torque Tgen, intake negative pressure Peng, or the like.

Figure 6:
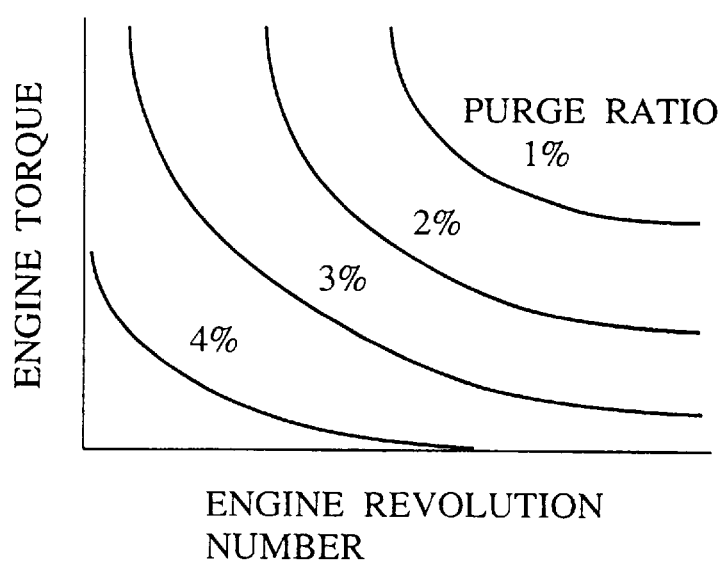
FIG. 6 is a data chart showing that a vapor purge quantity can be expressed as functions of engine revolution number and engine torque in a map format, which is utilized in explanations of the flowchart in FIG. 5.

Next, step S203 will be explained hereunder. The vapor purge quantity Wpurge supplied from the canister 22 can be expressed as functions of the engine revolution number Neng and the engine torque Teng in a map format, as shown in FIG. 6. Therefore, if this map is set in advance in the control unit 16, a vapor purge quantity $\nabla$Wpurge derived from previous measurement to current measurement can then be detected (S203). Hence, an accumulated purge quantity Wpurge detected until the current calculation can obtained by adding the vapor purge quantity $\nabla$Wpurge to the accumulated value detected until the previous calculation. The accumulated value of the vapor purge quantity, which has been detected in this manner, is stored previously in a memory (not shown) in the control unit 16 to be used in succeeding calculation in S106 in FIG. 3.

Figure 7:
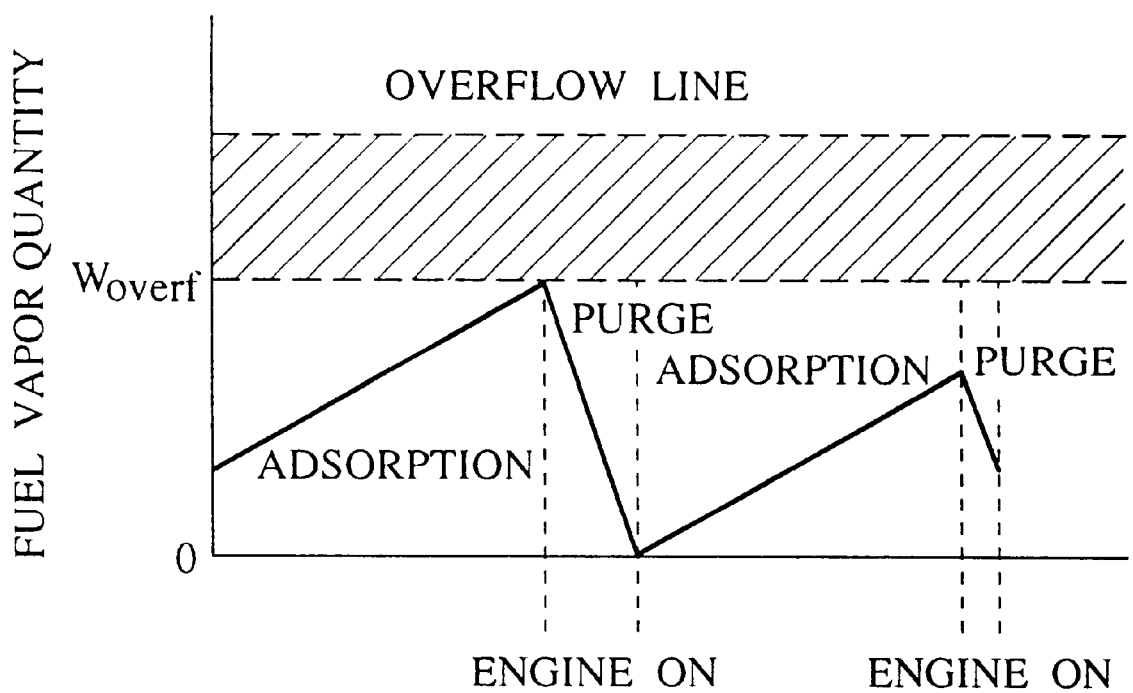
FIG. 7 is a conceptual view showing that a fuel vapor adsorption quantity in the canister can be always estimated by the first embodiment of the present invention.

As shown in FIG. 7, the fuel vapor adsorption quantity in the canister 22 can always estimated by incorporating the above control logic (see FIG. 5). Hence, it is capable of driving the engine to purge the fuel vapor to the engine side before the fuel vapor (Woverf) overflows the canister 22 to be discharged into the air. Thus, the fuel vapor can be burned in the engine and therefore deterioration in the air quality can be suppressed.

According to this embodiment, the existing fuel vapor system can be utilized to realize the fuel vapor suppressing (purging) system of the present invention. In addition, the fuel vapor suppressing (purging) system of the present invention can be achieved with a simple configuration at low cost. In particular, formulation of the program can be facilitated because of very simple control Logic.

(2) Second Embodiment

A second embodiment is a case where engine driving timing is controlled skillfully to thus improve an air quality improving effect and a battery deterioration preventing effect.

Figure 8:
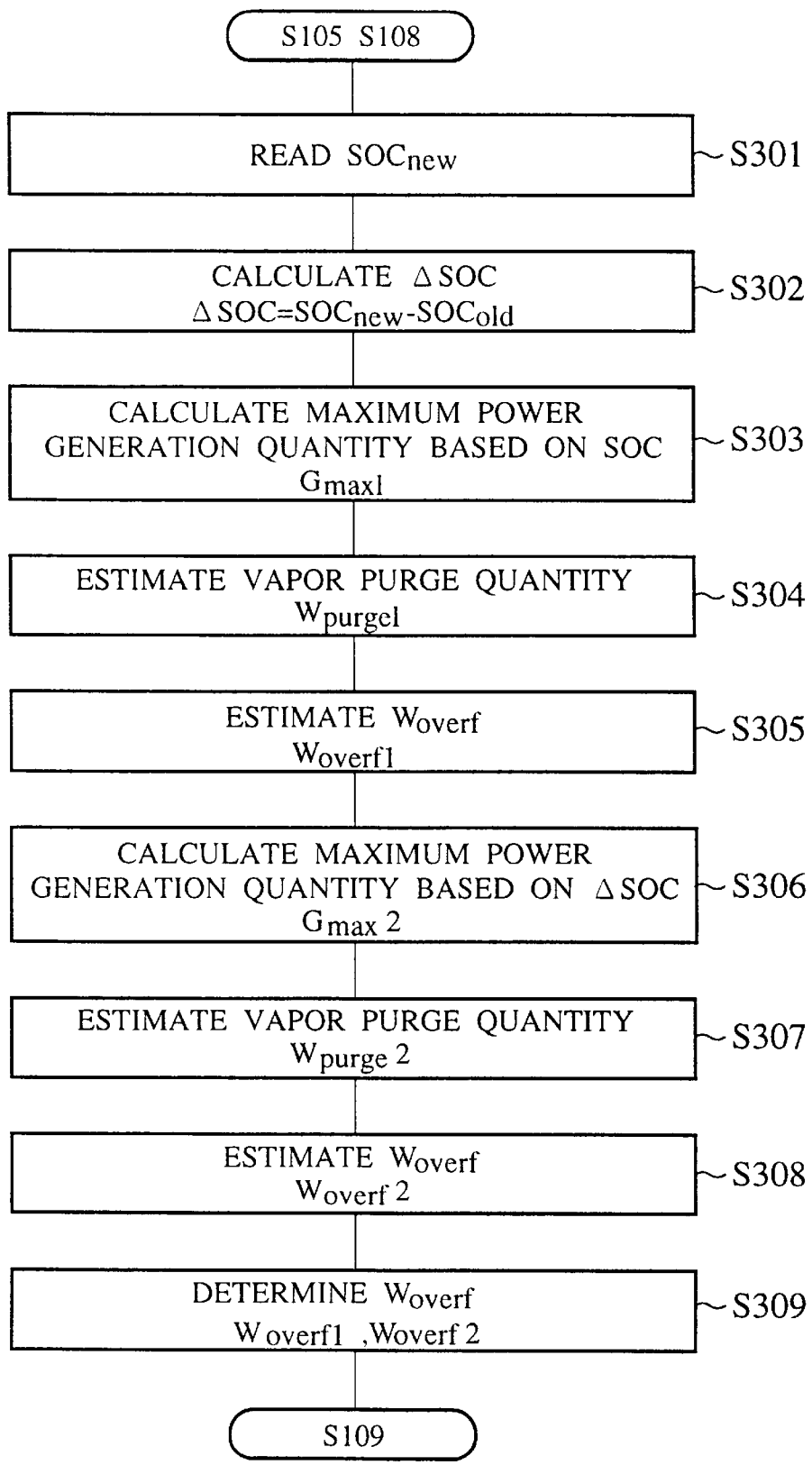
FIG. 8 is a flowchart illustrating an operation of a generator driving engine controlling system according to a second embodiment of the present invention.

FIG. 8 is a flowchart illustrating an operation of the fuel vapor purging system according to a second embodiment of the present invention.

A starting point of this flowchart is either S105 or S108 in the first embodiment (see FIG. 3).

In S301, a current battery charge quantity SOCnew is read. In S302, this SOCnew is then compared with the battery charge quantity SOCold (which has been stored in the memory) detected in previous measurement to detect a change rate $\nabla$SOC per time of the battery charge quantity SOC (i.e., $\nabla$SOC=SOCnew-SOCold, and $\nabla$SOC is an average battery consumption quantity per measuring time period). In S303, a maximum available charge quantity Gmax1 at this time is then calculated based on the current battery charge quantity SOC.

In S304, an available vapor purge quantity to the engine side can then be estimated based on the maximum available charge quantity Gmax1. Thus, in S305, an allowable overflow value Wpurge1 from the canister 22 (an engine-drive starting vapor adsorption quantity) can then be determined. In a similar manner, in S306, a maximum available charge quantity Gmax2 at this time can then be calculated according to the average battery consumption quantity $\nabla$SOC.

In S307, an available purge quantity can then be estimated based on the maximum available charge quantity Gmax2 (=SOC). In S308, an allowable canister overflow quantity Wpurge2 can then be determined. In S309, the larger maximum available charge quantity of Woverf1 and Woverf2 which have been detected based on the battery charge quantity SOC and the average battery consumption quantity $\nabla$SOC, i.e., the maximum available charge quantity capable of delaying the engine drive timing, though small, is selected. The process then advances to S109 in FIG. 3.

FIGS. 9A and 9B are conceptual view showing operational principles in the second embodiment of the present invention.

If the battery charge quantity SOC is large (SOC large), generated energy by the generator 11 must then be reduced not to increase the battery charge quantity SOC beyond the value. Therefore, an engine output is made small and the intake air quantity becomes small, and therefore a great quantity of the fuel vapor cannot be purged. On the contrary, if the battery charge quantity SOC is small (SOC small), the generator driving engine 10 is then driven at heavy Load to increase the charge quantity. Hence, the intake air quantity is increased correspondingly and therefore a great quantity of the fuel vapor can be purged. This is shown as "difference in the purge quantity" in FIG. 9A.

Accordingly, as shown in FIG. 9A, even if the generator driving engine 10 is started from the same time point (a time point starting the engine ON), the vapor purge quantity from the canister 22 is different according to the degree of the battery charge quantity SOC. Therefore, such a control must be executed that a value of the allowable vapor quantity Woverf is changed according to the degree of the battery charge quantity SOC.

Furthermore, because the average battery consumption quantity $\nabla$SOC can be regarded to be equivalent to the available charge quantity, the engine output can be increased larger to thus able to increase the vapor purge quantity as the average battery consumption quantity $\nabla$SOC is increased larger. As shown in FIG. 9B, although the average battery consumption quantity $\nabla$SOC has an opposite tendency to that of the battery charge quantity SOC (see FIG. 9A), a value of the allowable vapor quantity Woverf can be expressed as a function of the average battery consumption quantity $\nabla$SOC.

Because such control logic is installed in the fuel vapor system, the engine driving time required to purge the fuel vapor can be set optimally. As a result, a total discharge quantity of the exhaust gas can be reduced.

According to this embodiment, the existing fuel vapor system can be utilized to embody the fuel vapor suppressing (purging) system of the present invention. In addition, such fuel vapor suppressing (purging) system can be realized with a simple configuration at low cost. In particular, the fuel vapor suppressing (purging) system of the present invention becomes effective in improving the air quality and preventing deterioration of the battery by controlling the engine drive timing to purge the fuel vapor according to charged condition of the battery.

What is claimed is:

1. A method of controlling a generator driving engine which includes an engine for receiving fuel supply from a fuel tank, a generator for generating electric energy when driven by mechanical output of said engine, and a battery for accumulating said electric energy generated by said generator, wherein a vehicle can be driven by rotating a motor by virtue of said electric energy accumulated in said battery, said method comprising the steps of:

detecting a fuel vapor quantity in said fuel tank based on a fuel temperature and a fuel residual quantity in said fuel tank;

detecting a fuel vapor purge quantity based on an engine revolution number and engine torque when said engine is driven; and estimating said fuel vapor quantity which is captured by a vapor capturing means, based on said fuel vapor quantity and said fuel vapor purge quantity;

wherein said engine can be driven to purge said fuel vapor to said engine before said fuel vapor overflows said vapor capturing means to thus be discharged into an air.

2. A method of controlling a generator driving engine according to claim 1, wherein an engine driving timing to purge said fuel vapor is controlled based on a battery charge quantity and a battery consumption quantity per unit time.

3. A system for controlling a generator driving engine which includes an engine for receiving fuel supply from a fuel tank, a generator for generating electric energy when driven by mechanical output of said engine, and a battery for accumulating said electric energy generated by said generator, wherein a vehicle can be driven by rotating a motor by virtue of said electric energy accumulated in said battery, said system comprising:

a fuel vapor quantity calculating unit calculating a fuel vapor quantity in said fuel tank;

a purge quantity calculating unit calculating a fuel vapor purge quantity based on an engine revolution number and engine torque when said engine is driven;

a vapor capturing devise capturing said fuel vapor;

an estimating unit estimating said fuel vapor quantity captured by said vapor capturing devise, based on said fuel vapor quantity calculating unit and said purge quantity calculating unit; and an engine controlling unit driving said engine before said fuel vapor overflows said vapor capturing devise to thus be discharged into an air.

4. A system for controlling a generator driving engine according to claim 3, further comprising a timing controlling unit controlling an engine drive timing to purge said fuel vapor based on a battery charge quantity and a battery consumption quantity per unit time.

5. A system for controlling a generator driving engine which includes an engine for receiving fuel supply from a fuel tank, a generator for generating electric energy when driven by mechanical output of said engine, and a battery for accumulating said electric energy generated by said generator, wherein a vehicle can be driven by rotating a motor by virtue of said electric energy accumulated in said battery, said system comprising:

a fuel vapor quantity calculating means for calculating a fuel vapor quantity in said fuel tank;

a purge quantity calculating means for calculating a fuel vapor purge quantity based on an engine revolution number and engine torque when said engine is driven;

a vapor capturing means for capturing said fuel vapor;

an estimating means for estimating said fuel vapor quantity captured by said vapor capturing means, based on said fuel vapor quantity calculating means and said purge quantity calculating means; and an engine controlling means for driving said engine before said fuel vapor overflows said vapor capturing means to thus be discharged into an air.

6. A system for controlling a generator driving engine according to claim 5, further comprising a timing controlling means for controlling an engine drive timing to purge said fuel vapor based on a battery charge quantity and a battery consumption quantity per unit time.

* * * * *